United States Patent [19]

Hemmen et al.

[11] 4,130,318
[45] Dec. 19, 1978

[54] HEADREST WITH SIDE PADS

[75] Inventors: Marcel Hemmen, Franconville; Jacky Herón, Suresnes, both of France

[73] Assignee: Regie Nationale des Usines Renault, Boulogne-Billancourt, France

[21] Appl. No.: 868,215

[22] Filed: Jan. 9, 1978

[30] Foreign Application Priority Data

Jan. 12, 1977 [FR] France ................................ 77 00703

[51] Int. Cl.² ............................................. A47C 1/10
[52] U.S. Cl. .................................... 297/410; 297/391; 297/384
[58] Field of Search ...................... 5/327 B; 128/134; 280/748, 751; 297/216, 384, 391, 406, 407, 410

[56] References Cited

U.S. PATENT DOCUMENTS

| | | | |
|---|---|---|---|
| 2,501,993 | 3/1950 | Conradt | 297/410 |
| 3,462,193 | 8/1969 | Tamura | 297/410 |

FOREIGN PATENT DOCUMENTS

| | | | |
|---|---|---|---|
| 2276798 | 1/1976 | France | 297/384 |
| 2288644 | 5/1976 | France | 297/384 |

*Primary Examiner*—James C. Mitchell
*Attorney, Agent, or Firm*—Oblon, Fisher, Spivak, McClelland & Maier

[57] ABSTRACT

A seat having a headrest wherein a side pad is mounted on a support attached to a lateral portion of the seat, bracketed to the back, and an adjusting mechanism permits setting the height of the pad.

1 Claim, 3 Drawing Figures

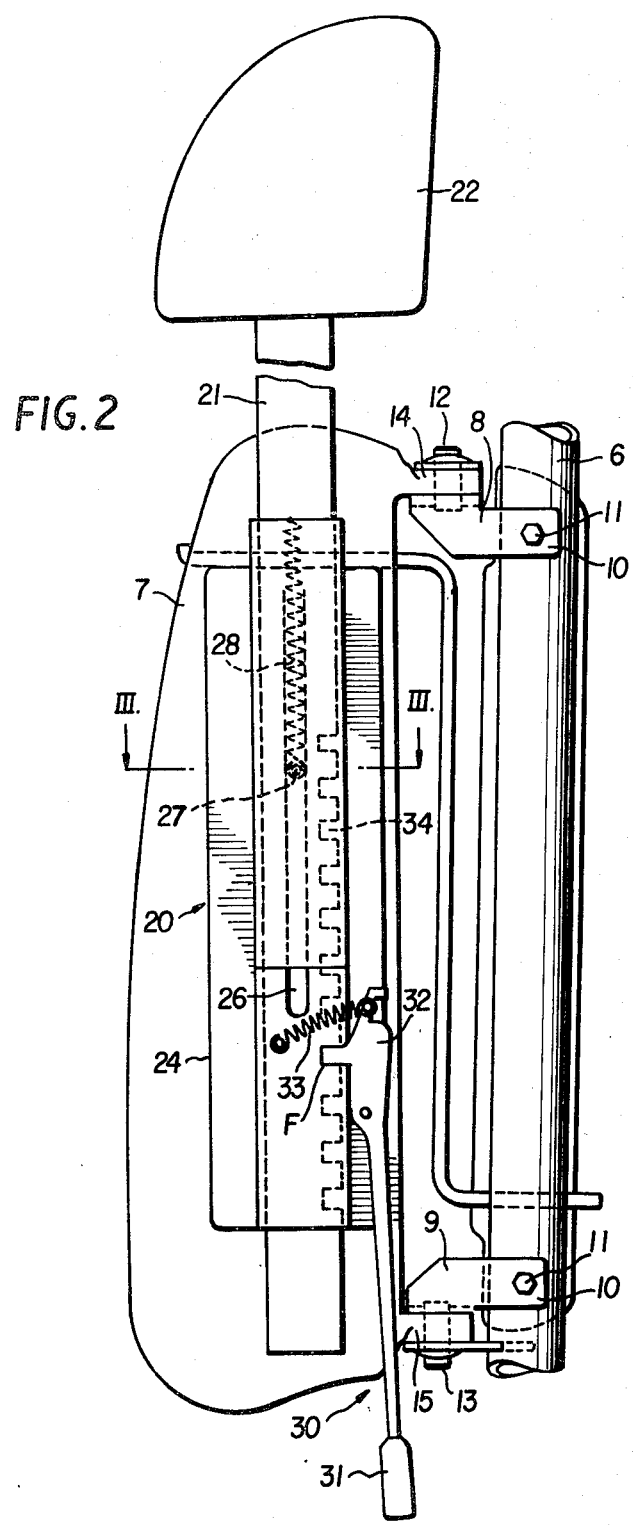
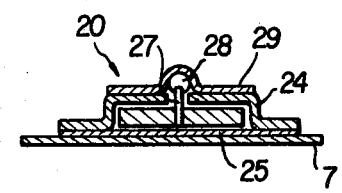
FIG. 2
FIG. 3

HEADREST WITH SIDE PADS

BACKGROUND OF THE INVENTION

The present invention relates to seats, and more particularly to a headrest with side pads and a means of adjusting the said pads with the aim of increasing the comfort of the occupant of a seat equipped with the headrest when relaxing or sleeping.

There is already known a headrest formed by the top of the back of the seat which has adjustable lateral support elements. To this end, the frame of the seat holds a guide and a slider, movable in the guide, is joined to an element for lateral support of the head. Since this type of support cannot be adjusted in height, it is constantly in the field of lateral vision of the occupant and constitutes a real bother in certain situations.

SUMMARY OF THE INVENTION

Accordingly, an object of the invention is a lateral pad headrest which resolves the problem posed by the loss of lateral visibility with existing headrests. According to the invention, the lateral pad of the headrest is mounted on a support integral with a lateral portion of the seat attached the back of the seat and an adjusting mechanism for the support attached to to the lateral portion of the seat permits control of the height of the pad.

According to another characteristic of the headrest, the lateral pad is angularly adjustable about the axis of rotation of an auxiliary frame holding the lateral portion of the seat back.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a plan view of an adjustable auxiliary frame of the back holding the lateral pad of the headrest; and FIG. 3 is a cross-section of the auxiliary frame along the line III—III in FIG. 2

DESCRIPTION OF THE PREFERRED EMBODIMENTS

Figure 1:
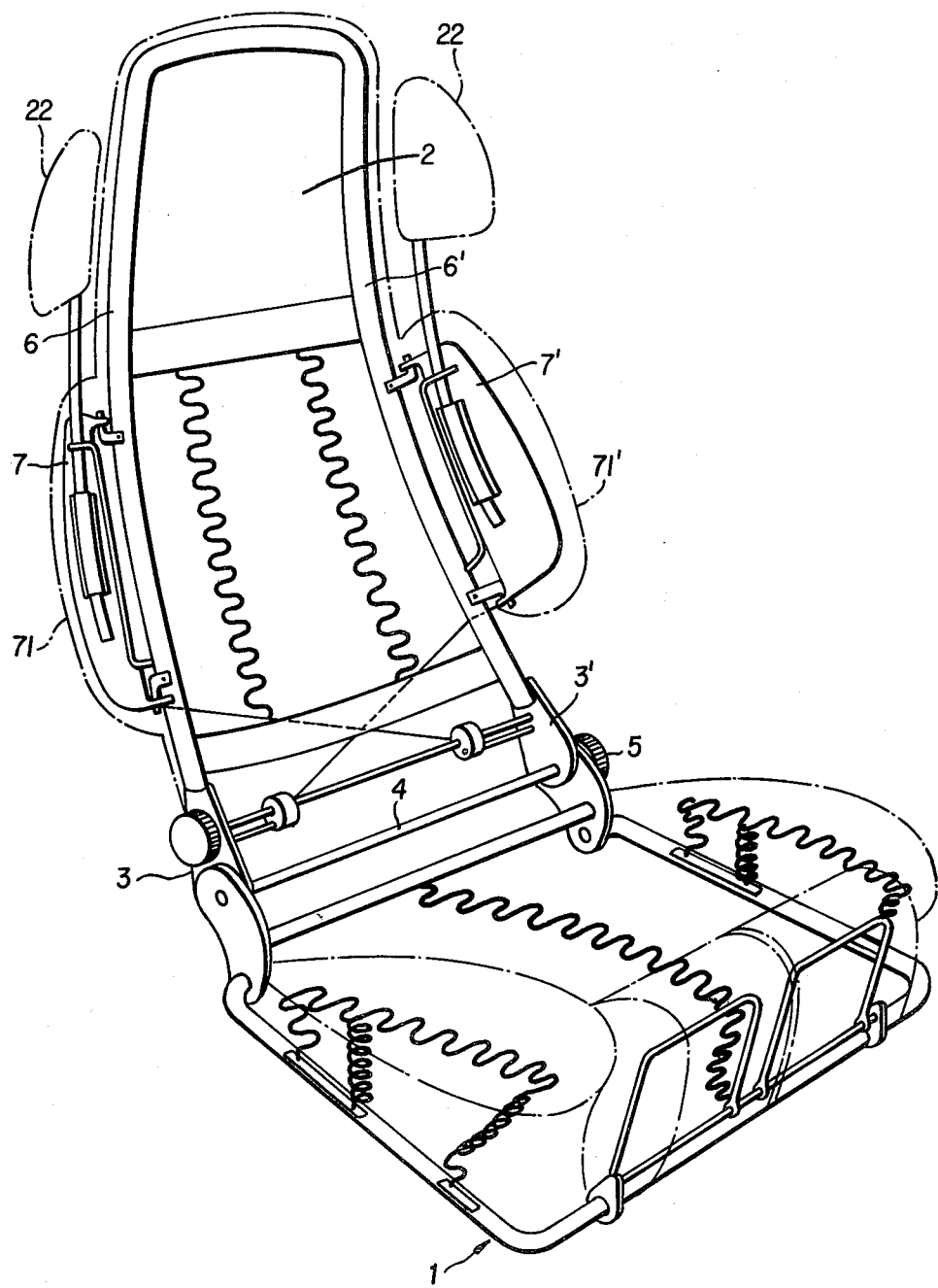
FIG. 1 is a perspective view of the skeleton of a seat the back of which is equipped with lateral headrest pads.

Referring now to the drawings, wherein like reference numerals designate identical or corresponding parts throughout the several views, and more particularly to FIG. 1 thereof, the seat shown in FIG. 1 comprises a frame 1 for the element forming the seat cushion and a frame 2 for the element of the seat forming the back with an integral headrest. The elements of the skeleton of the seat not described, since they are not relevant to the invention, conform to those of the seat described in the French Patent Application No. 74/23,117 filed July 3, 1974 in the name of the present applicant.

The frame 2 of the back is connected to the frame 1 of the seat cushion by the movable tips 3 and 3' tied to one another by an axle 4 subject to a mechanism with a straight-forward adjusting knob 5 for controlling the inclination of the back.

The frame 2 comprises two lateral uprights 6, 6' on which are disposed the auxiliary frames 7, 7'. The auxiliary frame, such as 7, shown in FIG. 2, is attached to the upright 6 by the intermediary of an upper support 8 and a lower support 9, each having two arms 10 joined to the upright 6 by bolts 11. These supports 8, 9 have welded to them the rotational axes 12 and 13, respectively. These axes 12, 13 engage lateral mounting flanges 14, 15 on the auxiliary frame 7. A control finger, not shown, is additionally welded to the auxiliary frame 7 or 7' for orienting this frame about the rotational axes 12, 13, as described in the above-mentioned application. Each auxiliary frame 7 or 7' carries a guide 20 for the sliding support 21 of the lateral pad 22 of the headrest and constitutes the support of the lateral portion of adjustable cushion 71, 71' attached to the seat back.

The guide 20 is made up of a piece 24 of ω profile, the wings of which are welded to a cover plate 25 and the guide assembly is welded or bolted to the corresponding auxiliary frame 7 or 7'.

The bottom of the channel 24 has a lengthwise a slot 26 for guiding an anchoring pin 27 for the ejection spring 28. The upper end of the ejection spring 28 is fastened to a back plate 29 which is shaped to fit around the spring 28, and this back plate is welded to the channel 24, as shown in FIG. 3.

In addition, an adjusting mechanism 30 for the support 21 is mounted on the lateral portion 71 or 71' to permit control of the height of the lateral pad 22. To this end, an adjusting lever 31 actuates a pivoted catch 32. In the example of FIG. 2, the lever 31 is prolonged by the catch 32 to form a single piece, but it is obvious that the members 32, 31 could just as well be mechanically coupled. A return spring 33 assures engagement of the catch 32 in one of the holding notches 34 along the support 21. To permit the introduction of the catch 32 into the holding notches 34, the channel 24 has a hole formed therethrough.

According to one characteristic of the arrangement 30, it is supported directly by the cover plate 25. Such a construction permits the realization of a sub-assembly comprising the side pad 22, the support 21, the guide 20 and the adjusting mechanism 30. Such a sub-assembly could be mounted on the lateral portion 71 or 71' of a preexistent seat.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a seat having a back frame and an adjustable cushion attached to the back frame, a headrest comprising: a pair of auxiliary frames disposed on a lateral side of the back frame, each auxiliary frame having an axis of rotation; a pair of supports, each support carried on an auxiliary frame; adjusting means for positioning each support on its auxiliary frame, said adjusting means including a row of holding notches located on each support and engageable with a catch movably fixed to the auxiliary frame, a guide fastened to each auxiliary frame and having a channel, an ejection spring disposed in each channel and acting upward on a support, and an anchoring pin disposed in each channel for anchoring the ejection spring in the channel; and a pair of adjustable side pads, each side pad mounted on a support and being movable with said support vertically, or angularly about the axis of rotation of its auxiliary frame; whereby adjustment of the auxiliary frames and adjusting means permits the side pads to be positioned out of the lateral field of vision of the person occupying the seat.

* * * * *